(12) United States Patent
Li et al.

(10) Patent No.: US 8,991,853 B2
(45) Date of Patent: Mar. 31, 2015

(54) RETRACTABLE STROLLER

(71) Applicant: Lerado (Zhong Shan) Industrial Co., Ltd., Zhong Shan, Guang Dong Province (CN)

(72) Inventors: Wei-Yeh Li, Tainan (TW); Bo-Wen Yang, Chiayi (TW)

(73) Assignee: Lerado (Zhong Shan) Industrial Co., Ltd, Zhong Shan, Guang Dong Province (CN)

( * ) Notice: Subject to any disclaimer, the term of this patent is extended or adjusted under 35 U.S.C. 154(b) by 0 days.

(21) Appl. No.: 14/039,511

(22) Filed: Sep. 27, 2013

(65) Prior Publication Data

US 2014/0091560 A1  Apr. 3, 2014

(30) Foreign Application Priority Data

Sep. 28, 2012  (CN) .................... 2012 2 0500062 U

(51) Int. Cl.
| | | |
|---|---|---|
| *B62B 3/02* | (2006.01) | |
| *B62B 7/06* | (2006.01) | |
| *B62B 7/08* | (2006.01) | |

(52) U.S. Cl.
CPC ................. *B62B 3/022* (2013.01); *B62B 7/066* (2013.01); *B62B 7/086* (2013.01)
USPC ........................................ 280/650; 280/47.4

(58) Field of Classification Search
USPC ......... 280/638, 639, 642, 643, 644, 647, 648, 280/649, 650, 657, 658, 47.34, 47.38, 47.4
See application file for complete search history.

(56) References Cited

U.S. PATENT DOCUMENTS

| | | | | |
|---|---|---|---|---|
| 5,288,098 | A * | 2/1994 | Shamie ......................... | 280/642 |
| 5,772,234 | A * | 6/1998 | Luo ............................... | 280/642 |
| 6,105,997 | A * | 8/2000 | Watkins ......................... | 280/649 |
| 8,066,300 | B2 * | 11/2011 | Ohnishi ......................... | 280/647 |
| 8,104,788 | B2 * | 1/2012 | Cone, II ........................ | 280/650 |
| 2007/0013169 | A1 * | 1/2007 | Dotsey et al. ................. | 280/642 |
| 2011/0175305 | A1 * | 7/2011 | Chen et al. .................... | 280/30 |

* cited by examiner

*Primary Examiner* — John Walters
*Assistant Examiner* — Brian Swenson
(74) *Attorney, Agent, or Firm* — Muncy, Geissler, Olds & Lowe, P.C.

(57) ABSTRACT

A retractable stroller comprises a pair of push arms, a pair of second sliding mounts and a pair of foot rest mount. The pair of push arms are slidably and retractably coupling with a pair of front struts. The pair of second sliding mounts are fixedly mounted on the lower ends of the push arms in a way of slidable along the front struts; each sliding mount formed with an opening in a radial direction, and the pair of foot rest mounts are usable for connecting a foot support element therebetween for support an occupant's feet at an appropriate height. The pair of foot rest mounts are fixedly attached to the front struts in a position aligned with the opening so as to permit the second sliding mounts capable of sliding along the front struts and passing over the foot rest mount without obstacle of the foot rest mount.

10 Claims, 9 Drawing Sheets

RETRACTABLE STROLLER

BACKGROUND OF THE INVENTION

1. Field of the Invention

The present invention relates to a stroller, especially to a retractable stroller equipped with a pair of foot rest mounts for installing a foot support element therebetween at an appropriate height, which does not cause any obstacle to the downward sliding of the push arms when collapsing the retractable stroller in to a compact configuration.

2. Description of the Related Art

A typical retractable stroller are featuring with a pair of push arms capable of sliding along the front strut so as to retract in length of the stroller when collapsing into a compact configuration. In order to avoid the foot support element cause an obstacle to the sliding of the push arms, the foot support element is normally arranged as low as possible, which can even be lowered to a position near to the front wheels.

However, according to a design standard for stroller products, the appropriate distance from the seat surface to the foot support element is ranging from 200 to 230 mm, otherwise the occupant's feet can not be supported in a comfortable condition. However, opt for the priority about to provide the occupant with comfortable feet support, or to lower the foot support for avoiding the obstacle to the sliding of the push arms, is always a dilemma to the designers and engineers.

SUMMARY OF THE INVENTION

For solving the mentioned dilemma to the designers and engineers, the present invention provides a retractable stroller comprising a pair of front struts for connecting at least two front wheels, a pair of rear struts for connecting at least two rear wheels, a pair of joints for articulately connecting the rear struts to the front struts, a first cross-brace linkage extending at the lower end of the retractable stroller, and a second cross-brace linkage extending at the rear end of the retractable stroller.

The retractable stroller according to the present is characterized in comprising a pair of push arms, a pair of second sliding mounts and a pair of foot rest mount. The pair of push arms are slidably sleeved through the pair of joints respectively and equipped with a pair of first sliding mounts on the intermediate portion of the push arms thereby slidably and retractably coupling with the pair of front struts.

The pair of second sliding mounts are fixedly mounted on the lower ends of the push arms in a way of permitting the front struts slidable along the sliding mounts; each sliding mount is formed with an opening in a radial direction thereof, and the pair of foot rest mounts are usable for connecting a foot support element therebetween for supporting an occupant's feet at an appropriate height.

The pair of foot rest mounts are formed integrally with or attached to the front struts in a position aligned with the opening of the sliding mount so as to permit the second sliding mounts capable of sliding along the front struts and passing over the foot rest mount without obstacle of the foot rest mount. By this arrangement, the foot support element can be provided to support the occupant's feet at an appropriate height.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
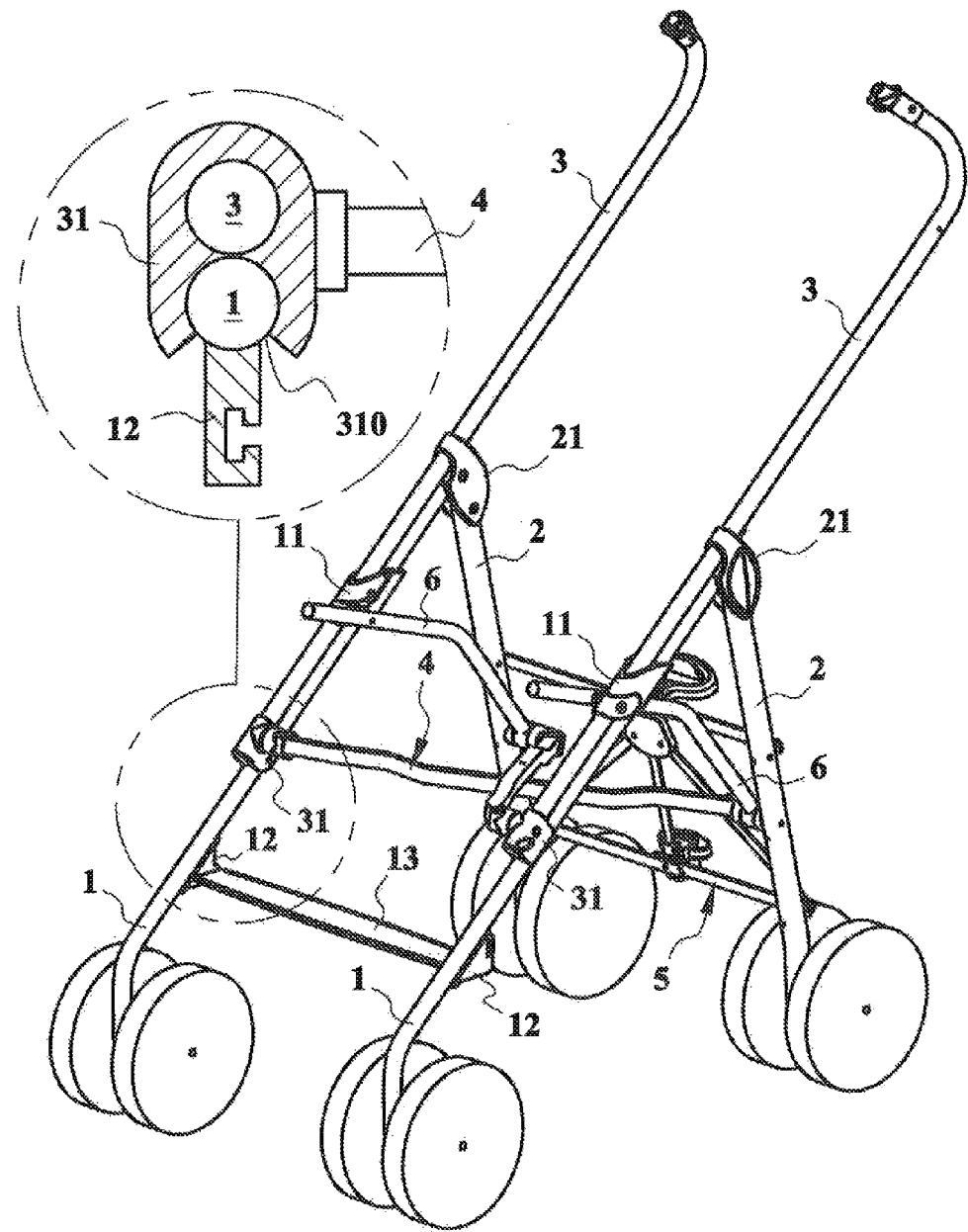
FIG. 1 shows a front-left perspective view of the embodiment of the retractable stroller equipped with a foot support element according to the present invention.
Figure 2:
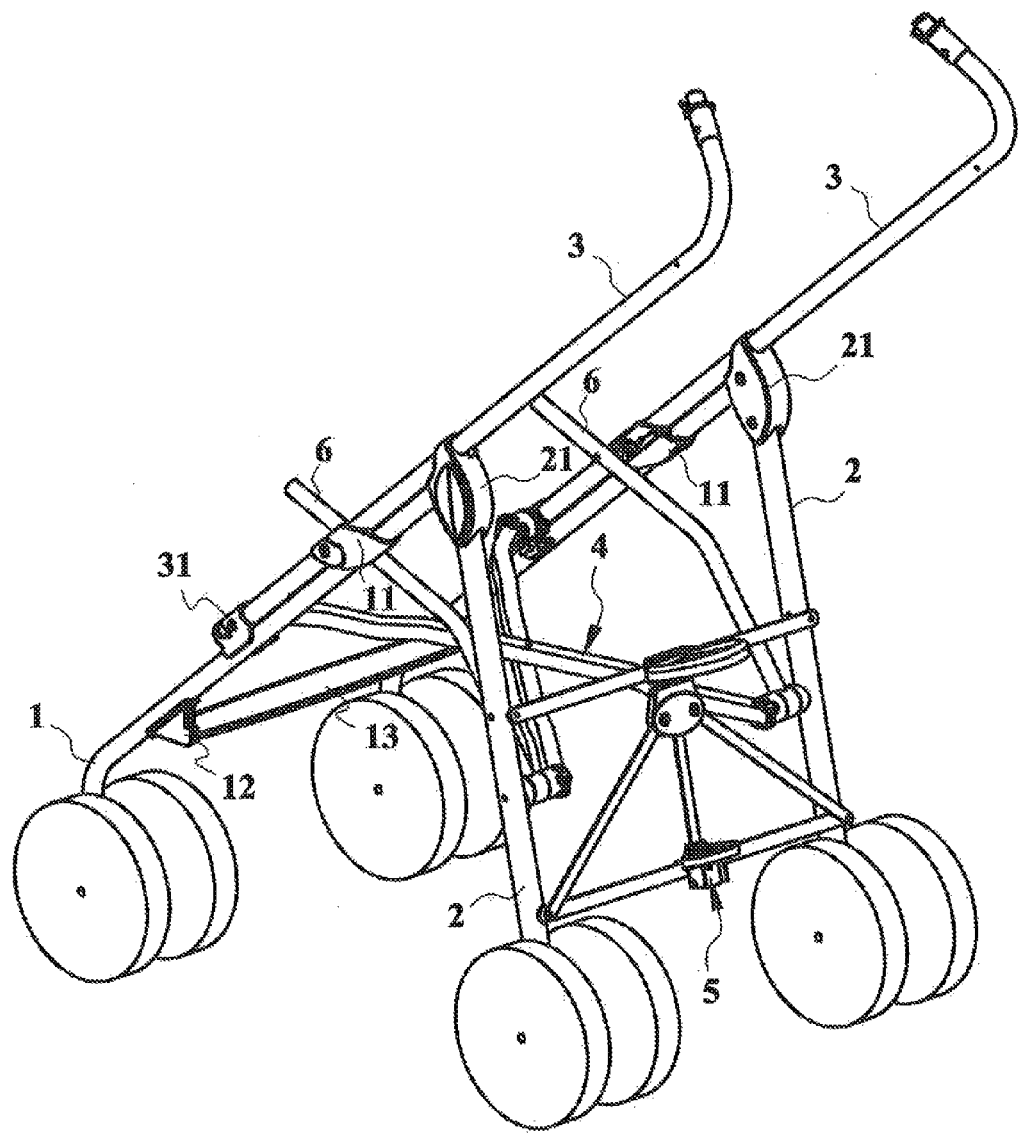
FIG. 2 shows a rear-left perspective view of the embodiment of the retractable stroller equipped with a foot support element according to the present invention.
Figure 3:
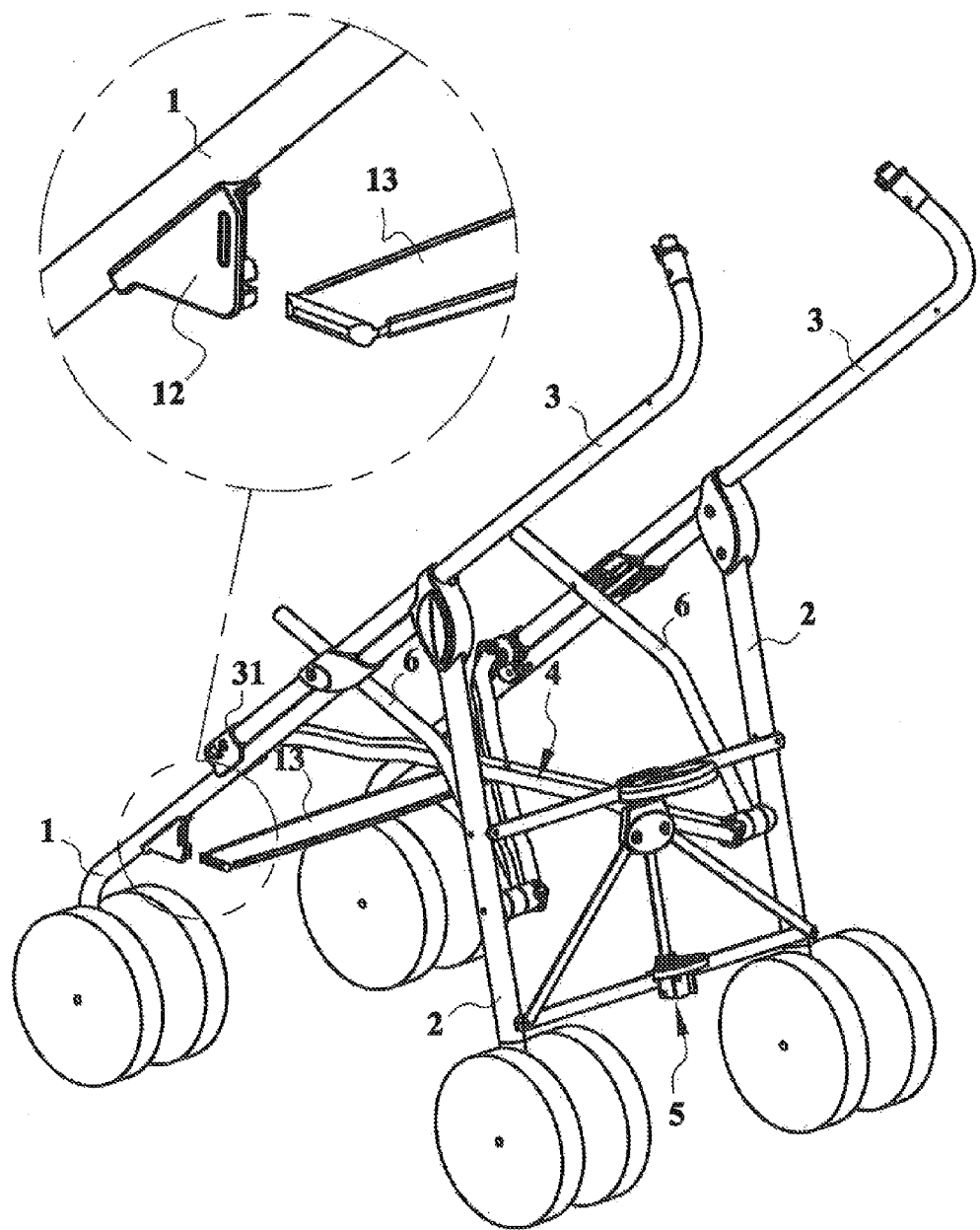
FIG. 3 schematically shows the assembly of the foot support element to the retractable stroller according to the present invention.
Figure 4:
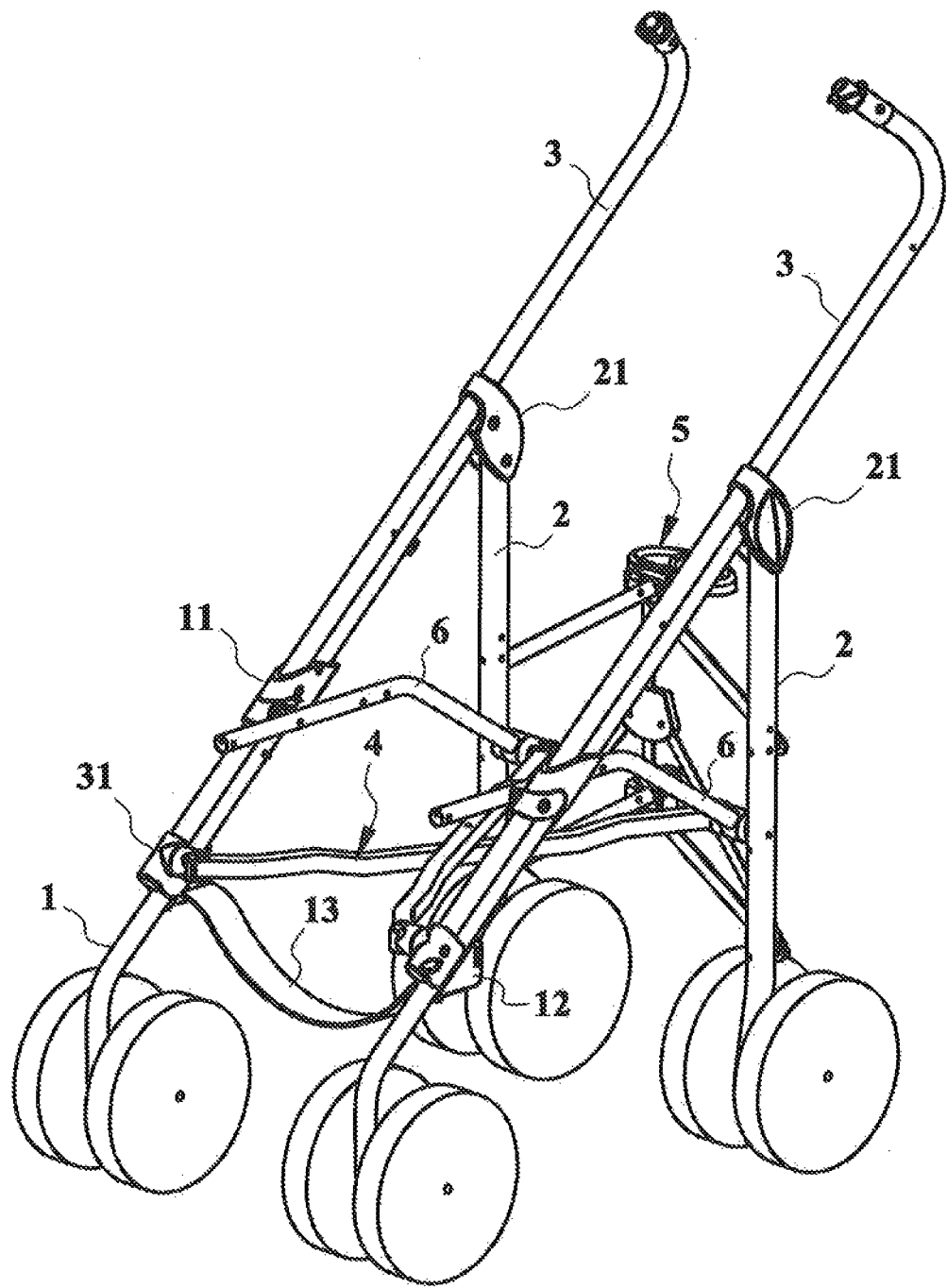
FIG. 4 schematically shows a front-left perspective view of the embodiment of the retractable stroller, featuring with the push arms capable of sliding forward and downward along the front struts without any obstacle caused by the foot support element.
Figure 5:
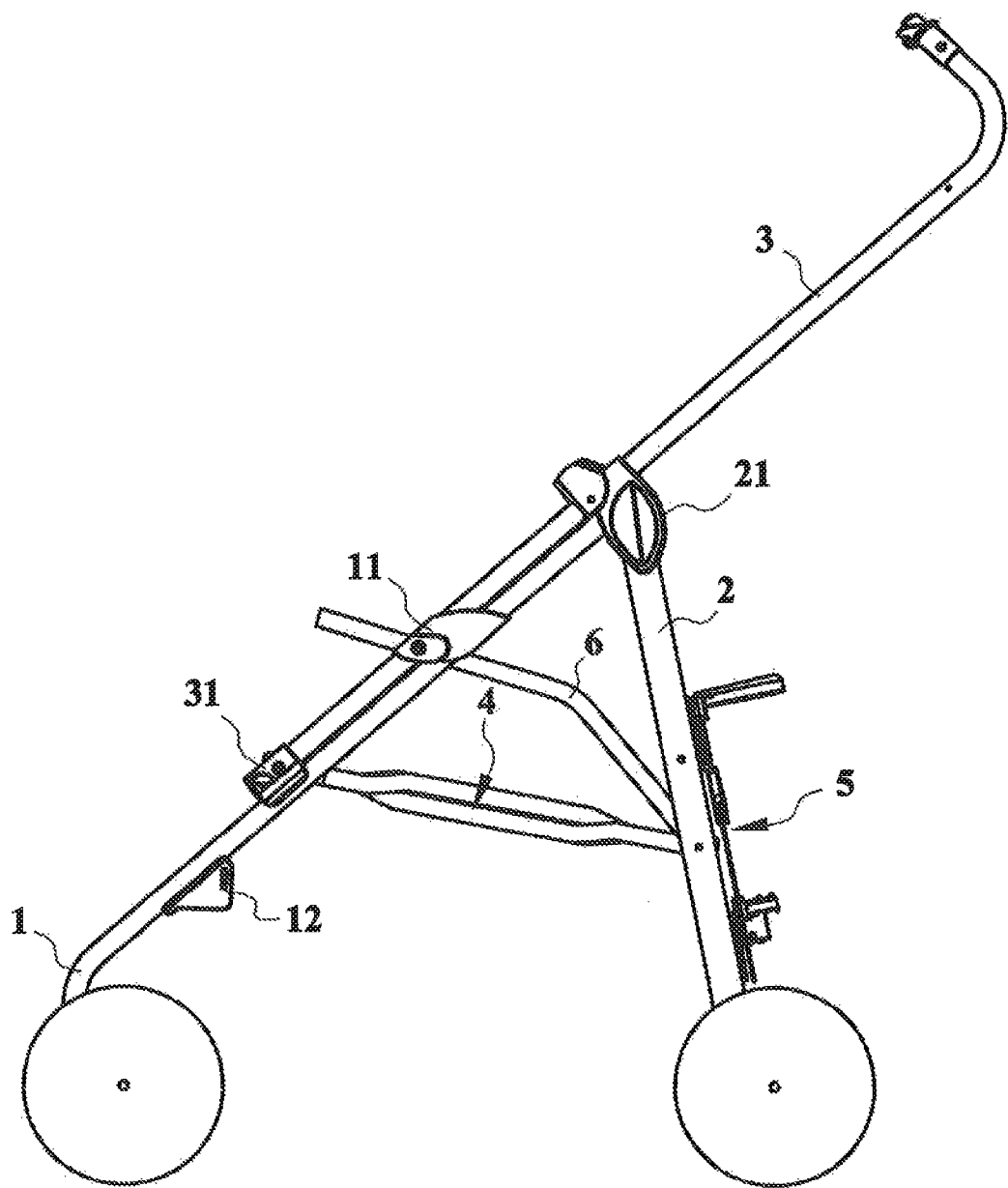
FIG. 5 shows a side view of the embodiment of the retractable stroller equipped with a foot support element according to the present invention.

Referring to FIGS. 1 to 5, an embodiment of the retractable stroller according to the present invention comprises a pair of front struts 1 for connecting at least two front wheels, a pair of rear struts 2 for connecting at least two rear wheels, a pair of joints 21 for articulately connecting the rear struts 2 to the front struts 1, a first cross-brace linkage 4 extending at the lower end of the retractable stroller, and a second cross-brace linkage 5 extending at the rear end of the retractable stroller.

Figure 9:
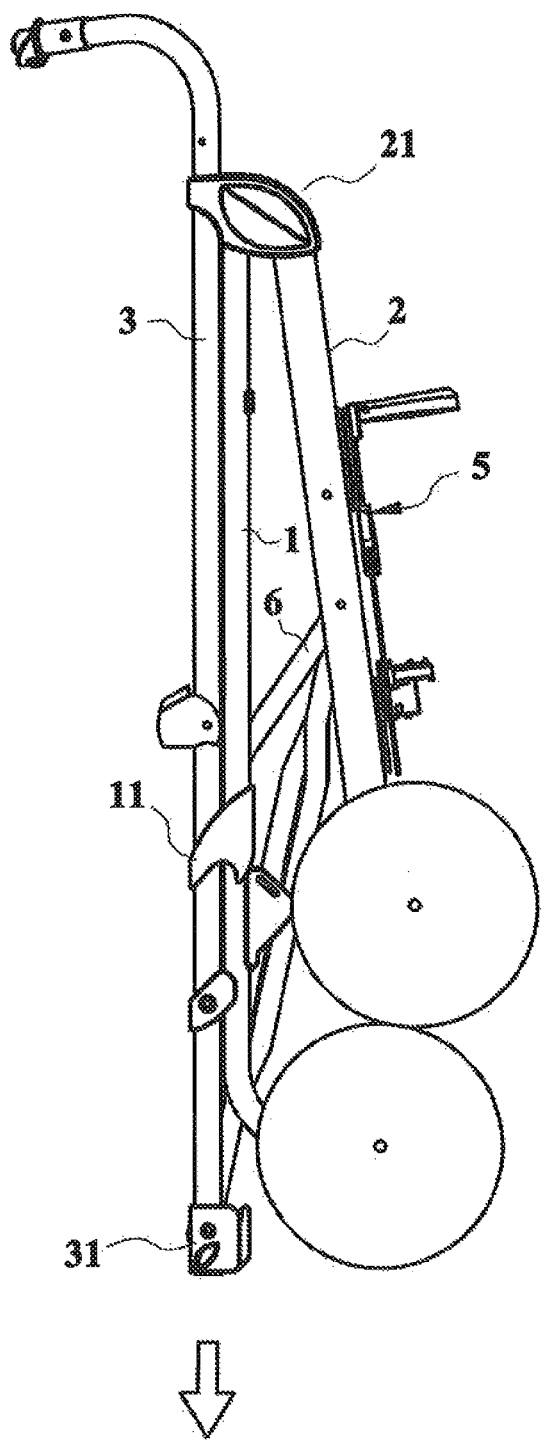
FIG. 9 is a schematic side view showing the rear struts is driven by the sliding of the push arms through the seat support tube. The retractable stroller has been collapsed into a compact configuration, and the push arms has been retracted and overlapped with the front strut.

The rear struts 2 are associated by the second cross-brace linkage 5, and the front struts 1 and the rear struts 2 are associated by the first cross-brace linkage 4. The second cross-brace linkage 5 can be locked to keep the retractable stroller in an in-use configuration as shown in FIGS. 1 to 5, and can be unlocked to permit the front struts 1 and the rear struts 2 to move and close to each other, so as to convert the retractable stroller into a compact configuration as shown in FIG. 9.

The retractable stroller is characterized in that the retractable stroller further comprise a pair of push arms 3, a pair of second sliding mounts 31 and a pair of foot rest mount 12. The pair of push arms 3 are slidably sleeved through the pair of joints 21 respectively and equipped with a pair of first sliding mounts 11 on the intermediate portion of the push arms 3 thereby slidably and retractably coupling with the pair of front struts 1.

The pair of second sliding mounts 31 are fixedly mounted on the lower ends of the push arms in a way of permitting the front struts 1 slidable along the sliding mounts 31; each sliding mount 31 formed with an opening 310 in a radial direction thereof, and the pair of foot rest mounts 12 are usable for connecting a foot support element 13 therebetween for support an occupant's feet at appropriate height. The pair of foot rest mounts 12 are attached to the front struts 1 in a position aligned with the opening 310 so as to permit the second sliding mounts 31 capable of sliding along the front struts 1 and passing over the foot rest mount 12 without obstacle of the foot rest mount 12.

Referring again to FIGS. 1 and 3, the foot rest mounts 12 are radially extending from the front struts 1, for instance, may be radially extending downward from the front struts 1 respectively.

The foot support element 13 may be made of flexible material, such as plastic plate, leather or fabric article, or any kinds of flexible plate capable of stretching by the pair of foot rest mounts 12. It can also be appreciated to a person skilled in the art that the foot support element 13 may be embodied to comprise a plurality of plates not shown pivotally jointed to one another between the pair of foot rest mounts 12. By this arrangement, the foot support element 13 can be folded between the foot rest mounts 12 and cause no resistance to the collapsing of the stroller.

Figure 6:
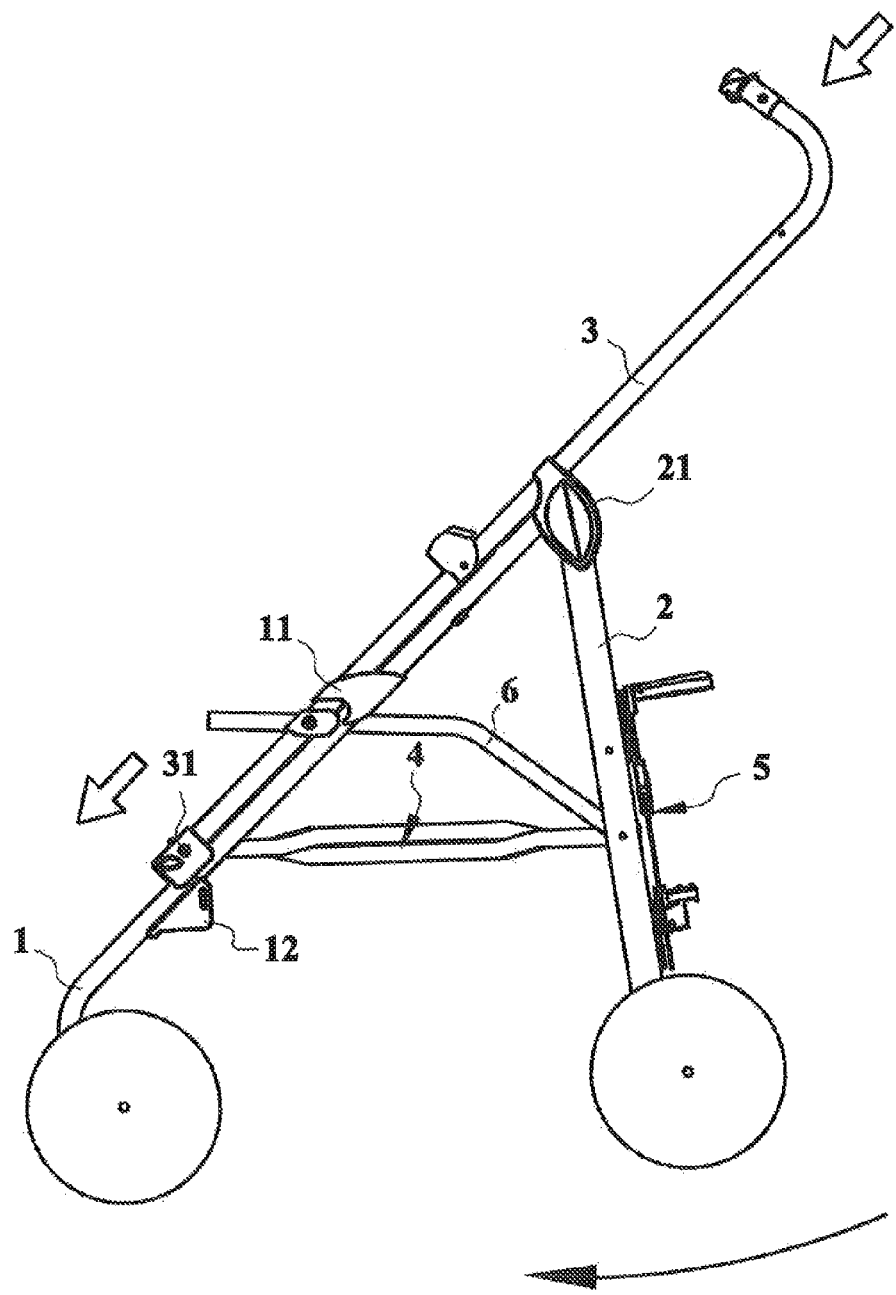
FIG. 6 is a schematic side view showing the rear struts can be driven by the sliding of the push arms through a seat support tube pivoted therebetween.
Figure 7:
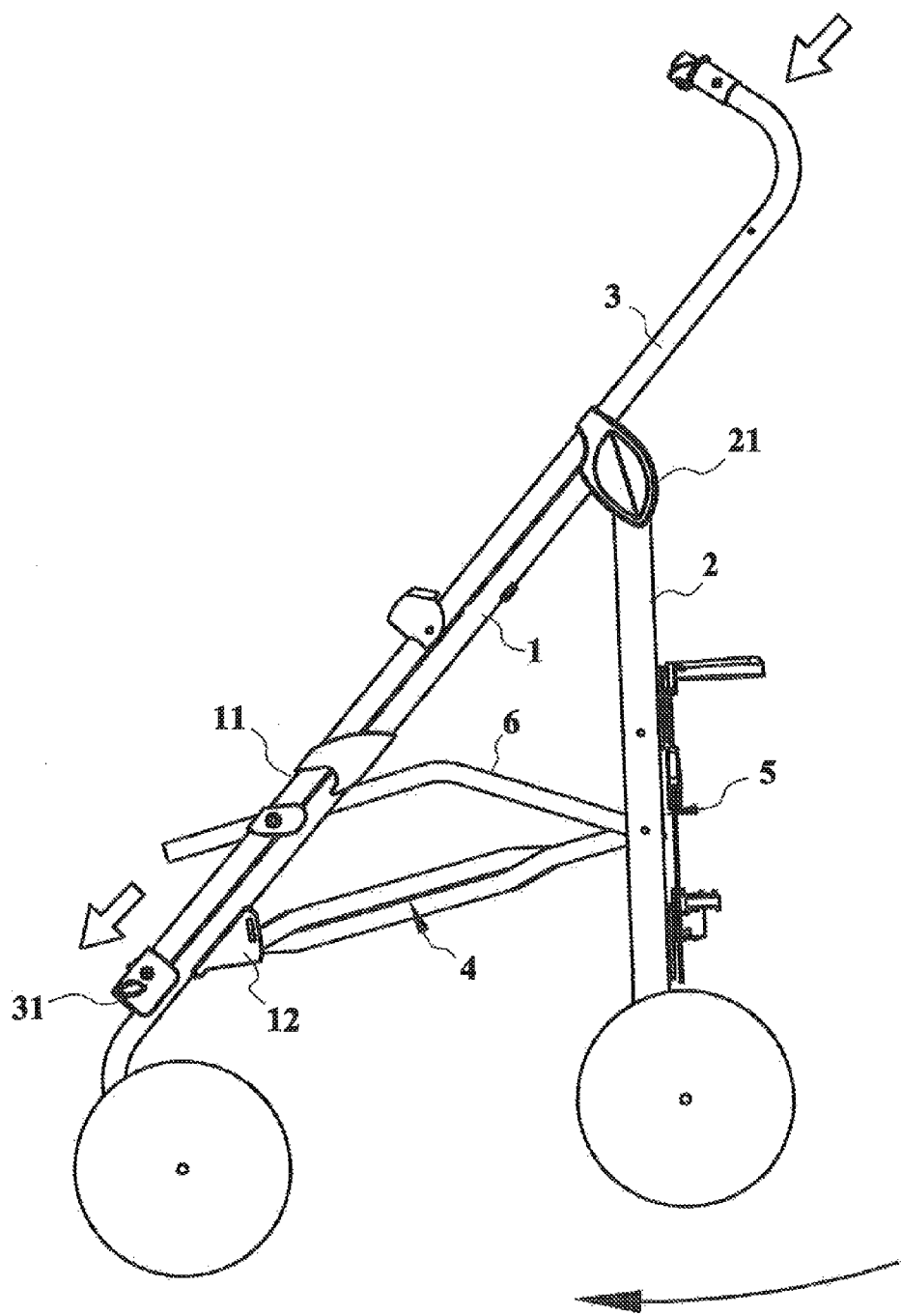
FIG. 7 is a schematic side view showing the rear struts is associating with the push arms through the seat support tube. The second sliding mounts 31 have been passing through the foot rest mount 12 without any obstacle.
Figure 8:
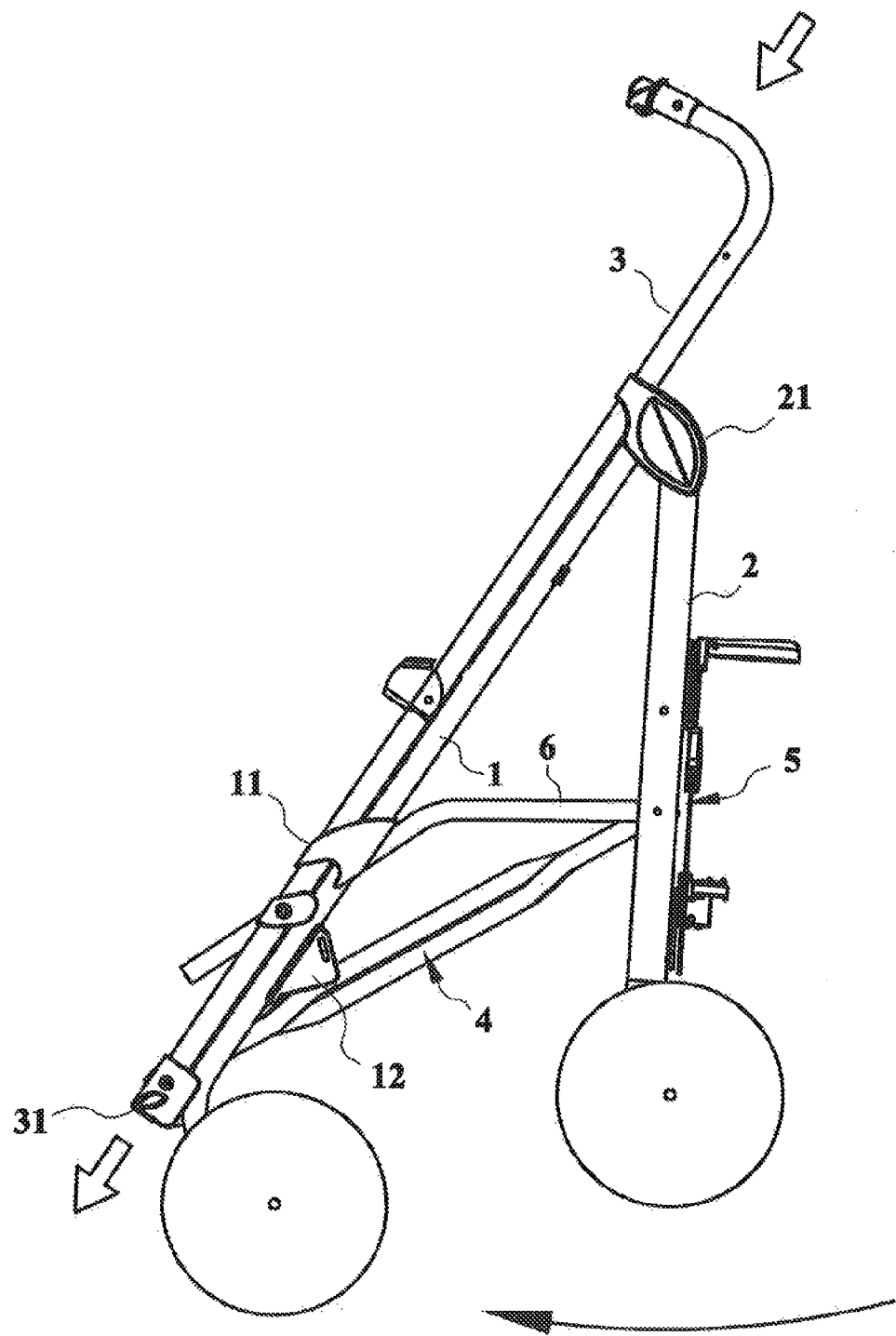
FIG. 8 is a schematic side view showing the rear struts is driven by the sliding of the push arms through the seat support tube. The push arms have been passing through the foot rest mount 12 and the distal end of the front struts without any obstacle.

Referring now to FIGS. 1 to 5, the retractable stroller may include a seat support tube 6 pivoted between the first sliding mounts 11 and the rear struts 2. The seat support tube 6 and the first cross-brace linkage 4 may be co-axially pivoted to the rear struts 2. Referring to FIGS. 6 to 8, by this arrangement, when the second cross-brace linkage 5 is unlocked and the push arms 3 are sliding downward and forward along the front struts 1, the first sliding mounts 11 are driven to associate the rear struts 2 to rotate toward the front struts 1 so as to collapse the retractable stroller in a longitudinal direction.

In the mean time, as the second sliding mounts 31 are pivoted with the first cross-brace linkage 4, when the push arms 3 are sliding downward and forward along the front struts 1, the second sliding mounts 31 is driven to associate the rear struts 2 and the front struts 1 moving toward each other via the first cross-brace linkage 4 so as to collapse the retractable stroller in width direction thereof.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A retractable stroller, comprising a pair of front struts (1) for connecting at least two front wheels, a pair of rear struts (2) for connecting at least two rear wheels, a pair of joints (21) for articulately connecting the rear struts (2) to the front struts (1), a first cross-brace linkage (4) extending at the lower end of the retractable stroller, and a second cross-brace linkage (5) extending at the rear end of the retractable stroller; the retractable stroller is characterized in that:

a pair of push arms (3) slidably sleeved through the pair of joints (21) and equipped with a pair of first sliding mounts (11) on an intermediate portion of the push arms (3) respectively, for slidably and retractably coupling with the pair of front struts (1);

a pair of second sliding mounts (31) fixedly mounted on the lower ends of the push arms in a way of permitting the front struts (1) slidable along the sliding mounts (31); each sliding mount (31) formed with an opening (310) in a radial direction thereof; and a pair of foot rest mount (12) for connecting a foot support element (13) therebetween, attached to the front struts (1) in a position aligned with the opening (310) so as to permit the second sliding mounts (31) capable of sliding along the front struts (1) and passing over the foot rest mount (12) without obstacle of the foot rest mount (12).

2. The retractable stroller according to claim 1, wherein the foot rest mounts (12) are extending downward from the front struts (1) respectively.

3. The retractable stroller according to claim 1, wherein the foot rest mounts (12) are radially extending from the front struts (1) respectively.

4. The retractable stroller according to claim 1, wherein the foot support element (13) is made of a flexible material.

5. The retractable stroller according to claim 1, wherein the foot support element (13) is a foldable and flexible plate capable of stretching by the pair of foot rest mounts (12).

6. The retractable stroller according to claim 1, wherein the foot support element (13) includes a plurality of plates pivotally jointed to one another between the pair of foot rest mounts (12).

7. The retractable stroller according to claim 1, wherein the second sliding mounts (31) are pivoted with the first cross-brace linkage (4), when the push arms (3) are sliding downward and forward along the front struts (1), the second sliding mounts (31) is driven to associate the rear struts (2) and the front struts (1) moving toward each other via the first cross-brace linkage (4) so as to collapse the retractable stroller in a width direction thereof.

8. The retractable stroller according to claim 1, further includes a seat support tube (6) pivoted between the first sliding mounts (11) and the rear struts (2), when the push arms (3) are sliding downward and forward along the front struts (1), the first sliding mounts (11) are driven to associate the rear struts (2) to rotate toward the front struts (1) so as to collapse the retractable stroller in a longitudinal direction.

9. The retractable stroller according to claim 8, wherein the seat support tube (6) and the first cross-brace linkage (4) are co-axially pivoted to the rear struts (2).

10. The retractable stroller according to claim 1, further characterized in that the rear struts (2) are associated by the second cross-brace linkage (5), and the front struts (1) and the rear struts (2) are associated by the first cross-brace linkage (4); the second cross-brace linkage (5) can be locked to keep the retractable stroller in an in-use configuration, and can be unlocked to permit the front struts (1) and the rear struts (2) to move and close to each other, so as to convert the retractable stroller into a compact configuration.

* * * * *